Patented Sept. 25, 1945

2,385,688

UNITED STATES PATENT OFFICE 2,385,688

PROCESS FOR COAGULATING NEOPRENE DISPERSIONS BY MEANS OF MAGNESIUM SALTS

Albert S. Carter, Wilmington, Del., and Thomas G. Webber, Woodbury, N. J., assignors to E. I. du Pont de Nemours & Company, Wilmington, Del., a corporation of Delaware No Drawing. Application June 21, 1941, Serial No. 399,226

8 Claims. (Cl. 260—27)

This invention relates to the coagulation of latex-like dispersions of neoprene. More particularly, it relates to the coagulation of such dispersions wherein the dispersing agents are products obtained by treating rosin and hydrogenated rosin with excess caustic and the coagulating agents are magnesium salts.

Many theories have been advanced to account for the phenomenon of coagulation of dispersions. Also, many materials are known to have greater or lesser coagulating effects on both natural and synthetic dispersions. No theory will account for the action of all coagulants or for the variation in the action of coagulants on various dispersions. It has been found that, for some purposes, neoprene (modified or unmodified polymeric 2-chloro-1,3-butadiene) can best be made by polymerizing an emulsion of 2-chloro-1,3-butadiene and thereby obtaining a latex-like dispersion of polymer. The dispersion is then coagulated and the neoprene obtained in suitable form for further use. Coagulation can be effected by freezing or by the addition of ethyl alcohol or acetone or sodium chloride. With some type of dispersions, acids may be used as coagulants. All of these methods have the disadvantage that at least a part of the dispersing agent or a reaction product thereof remains in the coagulum from which it is difficult to remove. Where the dispersing agent is a product obtained by treating rosin or hydrogenated rosin with excess caustic, its presence in the coagulum is particularly objectionable because the neoprene containing agents of this type is unduly water absorptive after curing.

It is an object of this invention to produce a cured neoprene having improved resistance to water absorption. Another object is to produce a water-resistant neoprene from a dispersion of neoprene wherein the dispersing agent is a product obtained by treating a member of the group consisting of rosin and hydrogenated rosin with excess caustic. A further object is an improved method of coagulating such dispersions of neoprene. Other objects will appear hereinafter.

It has been discovered that these objects can be accomplished by the use of water-soluble magnesium salts, and especially magnesium sulfate, as the coagulating agent.

In order that the process may be more fully understood, the following specific example is given by way of illustration, but the invention is not limited thereto as will become more apparent hereinafter.

Example

The latex to be coagulated was prepared as follows: Chloroprene (100 parts) containing 0.6 part of sulfur and 4 parts of rosin was emulsified by mechanical agitation in 227 parts of water containing 0.5 part of ammonium persulfate, 0.8 part of sodium hydroxide and 0.5 part of the sodium salts of the dinaphthyl methane sulfonic acid prepared according to U. S. Patent No. 1,336,759. The resulting dispersion was kept at 40° C. in a suitable vessel which could be externally cooled and heated until the density ceased to increase, indicating that the polymerization was substantially complete. The resulting latex was then stabilized with 2.5 parts of tetra ethyl thiuram disulfide and was then agitated with 111 parts of a 3 per cent aqueous solution of hydrated magnesium sulfate, $(MgSO_4.7H_2O)$ which caused complete coagulation. The coagulum was then washed free from the excess of magnesium sulfate by passage through a rubber mill with corrugated rolls under a spray of fresh water. The excess of magnesium sulfate was thus rapidly removed, the dispersing agents having been converted into insoluble salts which remained in the polymer. The washing step was, accordingly, much shorter than in earlier processes where the dispersing agents had to be washed out. The polymer was then dried by milling on a rubber mill with smooth rolls in the usual manner.

The mechanical feature of the operation was still more conveniently carried out, however, according to the method disclosed in the copending U. S. application of Wanderer, Serial No. 362,557, filed October 24, 1940. According to this method, the dispersion of chloroprene polymer and the solution of magnesium sulfate were fed simultaneously and continuously into a hopper in which coagulation took place and from which it dropped into the large rend of a chamber, in the form of a truncated cone in which a rotating worm forced the coagulum toward the smaller end of the conical chamber and then, under pressure, through a perforated plate. By this means, most of the water phase was separated from the coagulum which left the apparatus in a continuous thread-like or rope-like form. This then passed into another extruding machine, similar to the first, in which it was brought into contact with continuously added fresh water by the action of the rotating worm which stretched and tore the material and thus presented fresh surfaces to the action to the water. The washed material was then extruded in a continuous form as from the first apparatus and was further dried by passing through two additional extruding machines to which no water was added. From the last of these, the product was delivered in the form of continuous, nearly dry, threads. The residual water was readily removed by passing the threads continuously through a drying tunnel countercurrent to a stream of warm air. The dried polymer, prepared by either of these methods (100 parts by weight), when compounded with 7 parts of magnesium oxide and 5 parts of zinc oxide and cured, gave a stock which increased only 8.1 per cent in volume when immersed in the water at 100° C. for 2 days.

A water absorption of 7.2 per cent was obtained when the latex was acidified with dilute acetic acid before the coagulation by magnesium sulfate, but was otherwise treated as in the example.

For comparison, samples of the same latex as was used in the example were coagulated by other methods. The first method used was that preferred in U. S. Patent 2,187,146. According to this, the latex was frozen in the form of a thin layer upon the periphery of an internally cooled drum rotating and partly immersed in the latex, the frozen layer was removed from contact with the unfrozen latex and maintained in contact with the cooled drum until coagulation was complete, then removed and warmed to melt the ice. When the resulting thin, continuous sheet of coagulum was washed and dried as such or when worked up by the method of Wanderer above described, and then, in either case, compounded and cured as above, the water absorption was definitely higher (12.8 per cent) than when the much simpler coagulation method of the present invention (giving 8.1 per cent absorption) was used. A sample of the latex coagulated by adding solid sodium chloride, then washed and dried by the method of Wanderer, and compounded and cured, gave a water absorption of 45 per cent. Furthermore, a quantity of a 15 per cent solution of sodium chloride equal to that of the latex was required for efficient coagulation, as compared with one-third of the quantity of a 3 per cent solution of magnesium sulfate used in the example. It will thus be seen that the present invention provides a method for coagulating dispersions of neoprene which, in comparison with the prior art, is cheaper and simpler and gives a product which requires less subsequent treatment.

The term "emulsifying agent obtained by treating a member of the group consisting of rosin and hydrogenated rosin with excess caustic" includes agents so prepared from any type of rosin (such as American or French, gum or wood), or from products derived from any of these by either partial or complete hydrogenation. It also includes the products obtained without purification, as well as those resulting through purification of the abietic acids in the rosin. The preferred caustic is sodium hydroxide, although any base capable of dissolving the rosin, such as potassium and ammonium hydroxides may be used. The excess of caustic may vary from the minimum required to give a stable dispersion up to five or more times the amount required to neutralize the rosin. The excess usually used is from 50 per cent to 100 per cent of the latter amount.

While the rosin derivatives used to emulsify the chloroprene may be used alone, it is preferable also to have present a different type of dispersing agent; e. g., a sodium salt of a sulfonic acid of an alkylated naphthalene such as, for example, isopropyl naphthyl sulfonic acid, butyl naphthyl sulfonic acid, dinaphthyl methane sulfonic acid, etc. As the chloroprene polymerizes, the charge changes from an emulsion of liquid-in-water to a dispersion of solid-in-water. The rosin derivatives are much more effective in the liquid-in-water system than in the solid-in-water system, while the said sulfonic acids are more effective in the solid-in-water system; i. e., the dispersion of chloroprene polymer. The presence of the said sulfonic acid salts, therefore, greatly aids the stability of the chloroprene polymer system, and is extremely desirable where the dispersion is acid or is acidified before coagulation. Accordingly, in its preferred form, the present invention is directed to the coagulation of dispersions of neoprene wherein both a rosin derivative and a sodium salt of a sulfonic acid of an alkylated naphthalene are present. This is illustrated in the example.

We may use, as coagulating agents, any magnesium salts which are capable of giving aqueous solutions of a concentration of 1 per cent or more at the temperature at which the coagulation is carried out. Thus, magnesium chloride, magnesium nitrate, and magnesium acetate may be used to good advantage, although we prefer magnesium sulfate, both because of its availability and cheapness and its efficiency. The quantity of magnesium salt used should, preferably, lie between that theoretically required to react with all the dispersing agents and the excess of caustic present and twice this theoretical quantity, although less than the theoretical quantity will cause coagulation. Very large quantities of the salt, in addition to being unnecessary, tend to be retained in the coagulum and require a longer washing for their removal. Suitable concentrations of the magnesium salt in the solution added have been found to lie between 1 and 5 per cent. When a more dilute solution is used the total volume of liquid to be handled is unnecessarily increased; on the other hand, with a more concentrated solution, the salt is less effectively used. The temperatures at which the coagulation is carried out is not critical and may lie anywhere between the freezing point and boiling point of the system. Convenient temperatures lie between about 20° C. and 40° C.; that is, between ordinary temperature and the temperature at which the dispersion is polymerized.

As in the above example, the principal use of this invention is to convert the neoprene from the form of an aqueous dispersion to a form in which it is ready for compounding and conversion into articles of manufacture. The process may also be used to advantage, however, in the forming of articles directly from the latex. That is, the advantage of low water absorption may also be gained if the magnesium salt solutions of the present invention are substituted for the coagulating solutions used in the art. For example, the latex may be extruded through a suitable orifice into a solution of the magnesium salt, according to the general method described in the British Patent No. 393,172, thus forming a continuous thread of high water resistance. Similarly, articles such as gloves may be made by applying the latex to a suitable mold and then dipping the mold with the adhering layer of latex into a solution of the magnesium salt.

Salts of polyvalent metals other than magnesium, such as zinc sulfate, barium chloride, cobalt chloride, stannic chloride and lead acetates, will also cause coagulation of these neoprene dispersions in many cases, but all those which do are either less effective, or give products characterized by greater water absorption, instability, or other undesirable properties.

It is apparent that many widely different embodiments of this invention may be made without departing from the spirit and scope thereof, and, therefore, it is not intended to be limited except as indicated in the appended claims.

We claim:

1. In a process for making a water-resistant, rubber-like material by emulsifying 2-chloro-1,3-butadiene in an aqueous medium by means of a sodium salt obtained by treating a member of the group consisting of rosin and hydrogenated rosin with excess sodium hydroxide, polymerizing the 2-chloro-1,3-butadiene while so emulsified, coagulating the resulting dispersion of polymer and washing and drying the coagulum, the step of coagulating the said dispersion by means of magnesium sulfate in quantity sufficient to react with all the dispersing agent present.

2. In a process for making a water-resistant, rubber-like material by emulsifying 2-chloro-1,3-butadiene in an aqueous medium by means of a sodium salt of a sulfonic acid of an alkylated naphthalene and of a sodium salt obtained by treating a member of the group consisting of rosin and hydrogenated rosin with excess sodium hydroxide, polymerizing the 2-chloro-1,3-butadiene while so emulsified, coagulating the resulting dispersion of polymer and washing and drying the coagulum, the step of coagulating the said dispersion by means of magnesium sulfate in quantity sufficent to react with all the dispersing agent present.

3. In a process for making a water-resistant, rubber-like material by emulsifying 2-chloro-1,3-butadiene in an aqueous medium by means of a sodium salt obtained by treating a member of the group consisting of rosin and hydrogenated rosin with excess sodium hydroxide, polymerizing the 2-chloro-1,3-butadiene while so emulsified, coagulating the resulting dispersion of polymer and washing and drying the coagulum, the step of coagulating the said dispersion by adding thereto an aqueous solution of about 1 to 5 per cent concentration of magnesium sulfate in quantity sufficient to react with all the dispersing agent present.

4. In a process for making a water-resistant, rubber-like material by emulsifying 2-chloro-1,3-butadiene in an aqueous medium by means of a sodium salt of a sulfonic acid of an alkylated naphthalene and of a sodium salt obtained by treating a member of the group consisting of rosin and hydrogenated rosin with excess sodium hydroxide, polymerizing the 2-chloro-1,3-butadiene while so emulsified, coagulating the resulting dispersion of polymer and washing and drying the coagulum, the step of coagulating the said dispersion by adding thereto an aqueous solution of about 1 to 5 per cent concentration of magnesium sulfate in quantity sufficient to react with all the dispersing agent present.

5. In a process for making a water-resistant, rubber-like material by emulsifying 2-chloro-1,3-butadiene in an aqueous medium by means of sodium rosinate, polymerizing the 2-chloro-1,3-butadiene while so emulsified, coagulating the resulting dispersion of polymer, and washing and drying the coagulum, the step of coagulating the said dispersion by adding thereto an aqueous solution of about 1 to 5 per cent concentration of magnesium sulfate in quantity sufficient to react with all the dispersing agent.

6. In a process for making a water-resistant, rubber-like material by emulsifying 2-chloro-1,3-butadiene in an aqueous medium by means of sodium salt of dinaphthyl methane sulfonic acid and of sodium rosinate, polymerizing the 2-chloro-1,3-butadiene while so emulsified, coagulating the resulting dispersion of polymer, and washing and drying the coagulum, the step of coagulating the said dispersion by adding thereto an aqueous solution of about 1 to 5 per cent concentration of magnesium sulfate in quantity sufficient to react with all the dispersing agent.

7. In a process for making a water-resistant, rubber-like material by emulsifying 2-chloro-1,3-butadiene in an aqueous medium by means of sodium salt of hydrogenated rosin, polymerizing the 2-chloro-1,3-butadiene while so emulsified, coagulating the resulting dispersion of polymer, and washing and drying the coagulum, the step of coagulating the said dispersion by adding thereto an aqueous solution of about 1 to 5 per cent concentration of magnesium sulfate in quantity sufficient to react with all the dispersing agent.

8. In a process for making a water-resistant, rubber-like material by emulsifying 2-chloro-1,3-butadiene in an aqueous medium by means of sodium salt of dinaphthyl methane sulfonic acid and of sodium salt of hydrogenated rosin, polymerizing the 2-chloro-1,3-butadiene while so emulsified, coagulating the resulting dispersion of polymer, and washing and drying the coagulum, the step of coagulating the said dispersion by adding thereto an aqueous solution of about 1 to 5 per cent concentration of magnesium sulfate in quantity sufficient to react with all the dispersing agent.

ALBERT S. CARTER.
THOMAS G. WEBBER.